US008958414B1

(12) United States Patent
Wong

(10) Patent No.: US 8,958,414 B1
(45) Date of Patent: Feb. 17, 2015

(54) INTELLIGENT CHASSIS MANAGEMENT

(75) Inventor: David K. Wong, San Jose, CA (US)

(73) Assignee: Force10 Networks, Inc., San Jose, CA (US)

( * ) Notice: Subject to any disclaimer, the term of this patent is extended or adjusted under 35 U.S.C. 154(b) by 1915 days.

(21) Appl. No.: 12/152,952

(22) Filed: May 19, 2008

Related U.S. Application Data

(60) Provisional application No. 61/002,990, filed on Nov. 14, 2007.

(51) Int. Cl.
*H04L 12/66* (2006.01)
*H04L 12/28* (2006.01)
*H04J 3/16* (2006.01)
*H04J 3/22* (2006.01)
*G06F 15/173* (2006.01)
*G06F 9/455* (2006.01)

(52) U.S. Cl.
USPC ........... 370/352; 370/351; 370/465; 709/224; 703/23; 703/24

(58) Field of Classification Search
USPC ................ 370/382, 366, 352, 230, 503, 412; 709/224; 714/807
See application file for complete search history.

(56) References Cited

U.S. PATENT DOCUMENTS

| 2003/0014517 A1* | 1/2003 | Lindsay et al. ............... 709/224 |
| 2004/0015733 A1* | 1/2004 | Obara et al. .................. 713/300 |
| 2004/0131054 A1* | 7/2004 | Dittmar ......................... 370/366 |
| 2009/0006932 A1* | 1/2009 | Biran et al. ................... 714/807 |

\* cited by examiner

*Primary Examiner* — Asad Nawaz
*Assistant Examiner* — Stephanie Chang
(74) *Attorney, Agent, or Firm* — Haynes and Boone, LLP

(57) ABSTRACT

A modular system uses point-to-point communication between field-programmable gate arrays (FPGAs) on a control module and each port module, respectively, to manage basic module functions, such as power, environmental monitoring, and health checks on the modules and their components. This allows a chassis to be managed without fully powering each card first, frees processors on the modules from having to perform health checks, allows dedicated resources to rapidly monitor the health of each card, and prevents one bad card from disabling management of all cards.

18 Claims, 5 Drawing Sheets

INTELLIGENT CHASSIS MANAGEMENT

CROSS-REFERENCE TO RELATED APPLICATIONS

This application claims priority to co-owned, U.S. Provisional Patent Application Ser. No. 61/002,990, filed Nov. 14, 2007, by David K. Wong, entitled INTELLIGENT CHASSIS MANAGEMENT, which is incorporated herein by reference in its entirety.

BACKGROUND

1. Field of the Invention

The present disclosure relates generally to packet network devices, and more particularly to intelligent power management of a distributed platform for such a device.

2. Description of Related Art

Packet network devices such as switches and routers receive packets at a plurality of external ports, and forward those packets out other external ports, as appropriate, to advance the packets toward their network destinations. Medium-to-large switch/routers (e.g., more than 50 ports) typically employ a modular design, with a plurality of cards that plug into slots in a backplane, and communicate through the backplane.

FIG. 1 shows a high level block diagram for a modular switch/router 100, including some components thereof. The components shown include line cards LC0, LC1, LCn, router processor manager (RPM) cards RPM0, RPM1, and a backplane 110. Packets are received into and transmitted from switch/router 100 through the external ports on line cards LC0, LC1, and LCn, and are forwarded through switch/router 100 on a data plane (not shown; the data plane may include line card forwarding circuitry, which communicates through backplane signaling connections with separate switch fabric cards and/or a switch fabric on the RPMs). Within the chassis, the line cards and RPM cards pass control plane data through backplane connections that are separate from the data plane connections.

In this example, the control plane connections include a backplane Ethernet bus BPE and a backplane I²C (Inter-Integrated Circuit) two-wire bus. The backplane Ethernet bus couples Ethernet ports (EP0, EP1, EPn) on the line cards with Ethernet switches (ESWR0, ESWR1) on the RPMs. The Ethernet ports connect respectively to line card processors (LCP0, LCP1, LCPn) on the line cards, and the Ethernet switches connect respectively with control card processors (RCP0, RCP1) on the RPMs. This allows the control card processors to communicate with the line card processors using appropriately addressed internal packets, in order to exchange configuration data, routing/switching updates, line card software images, and heartbeat messages.

The I²C bus also connects the control card processors (RCP0, RCP1) on the RPMs with components on the line cards. For instance, software running on the control card processors can use the I²C bus to poll temperature monitors (TM0, TM1, TMn) and voltage monitors (VM0, VM1, VMn), one at a time, for line card environmental statistics. Other devices on the line cards are typically monitored in similar fashion.

BRIEF DESCRIPTION OF THE DRAWINGS

The present invention can be best understood by reading the specification with reference to the following Figures, in which.

DETAILED DESCRIPTION

Figure 1:
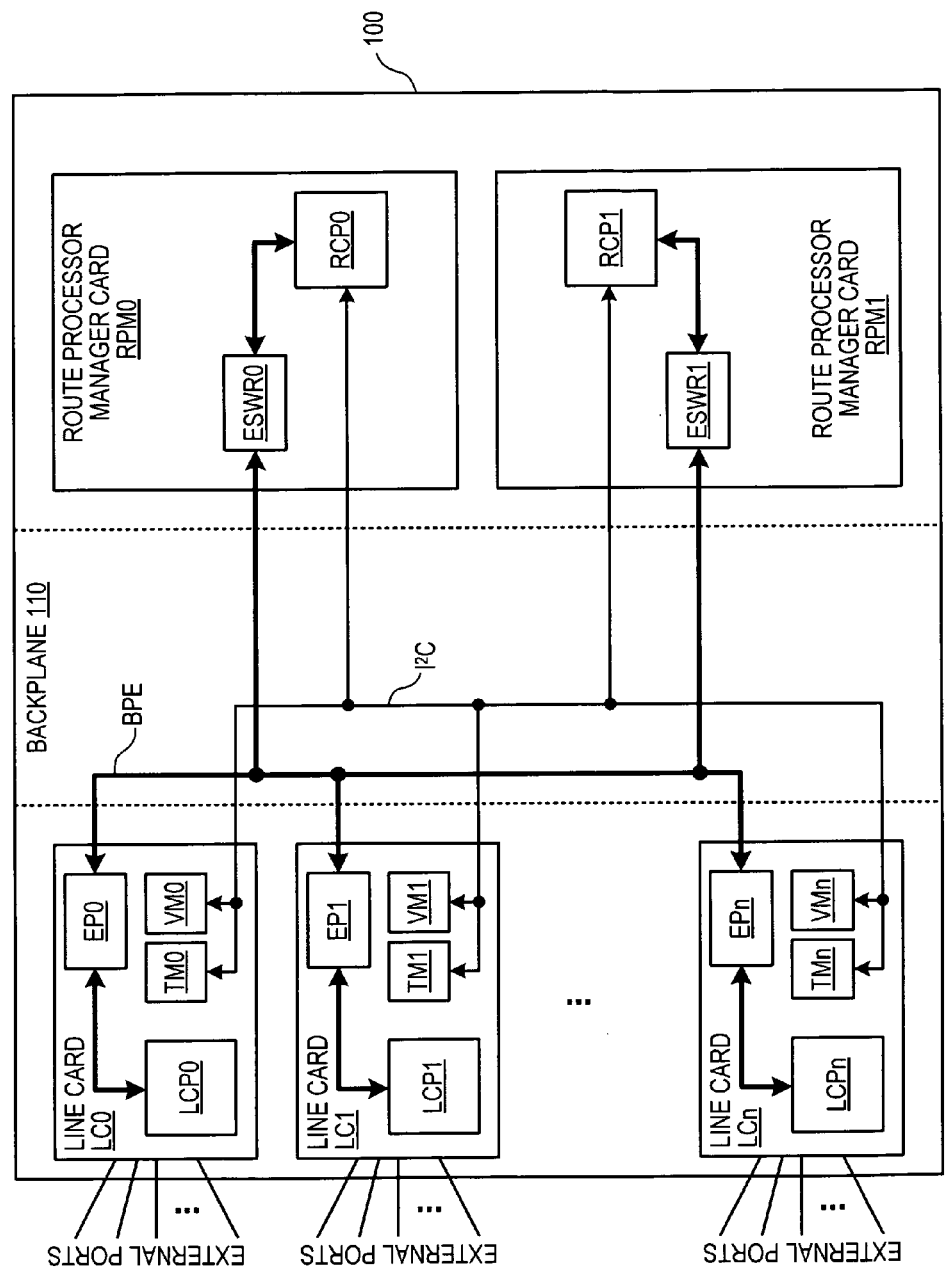
FIG. 1 contains a block diagram for a modular prior art switch.

The FIG. 1 control plane communication arrangement has now been found to have several significant drawbacks when used as described in a modular chassis. First, the use of a single management bus is unreliable, as one device malfunction on any card can cause the bus to fail for all cards sharing the bus. Second, the use of polling software on the control card processors can require a disproportionately high percentage of the control card processor CPU cycles to monitor all the devices in the chassis. Third, despite high CPU usage, this method is relatively slow to react to card failures, as a failure may not be detected until a device on the failed card is polled and the maximum response time expires. Fourth, the heartbeat messages exchanged by the line card CPUs and RPM CPUs consume additional CPU resources, and are susceptible to packet loss on the backplane Ethernet switches, leading to unnecessary line card reboots.

In the following embodiments, dedicated hardware resources such as a FPGA (Field-Programmable Gate Array) are employed on each card, with dedicated serial bus connections between each line card FPGA and each RPM FPGA (and between the RPM FPGAs). Preferably, these FPGAs receive power even when the card they serve is powered down, and automatically poll devices on their respective line cards for environmental and operational parameters. The line card FPGAs communicate with the RPM FPGAs to either push line card data to the RPMs, or respond to requests from the RPM FPGAs for such data. Although the line card FPGAs act as slaves to the RPM FPGAs, they are allowed to immediately push critical notifications to the RPM FPGAs. Also, the dedicated serial bus connections are used to exchange frequent hardware heartbeat messages, providing rapid indication of card failure/removal. In normal circumstances, the card CPUs can either ignore chassis management until notified of an event, or only intermittently monitor chassis conditions through registers on their respective FPGAs.

Figure 2:
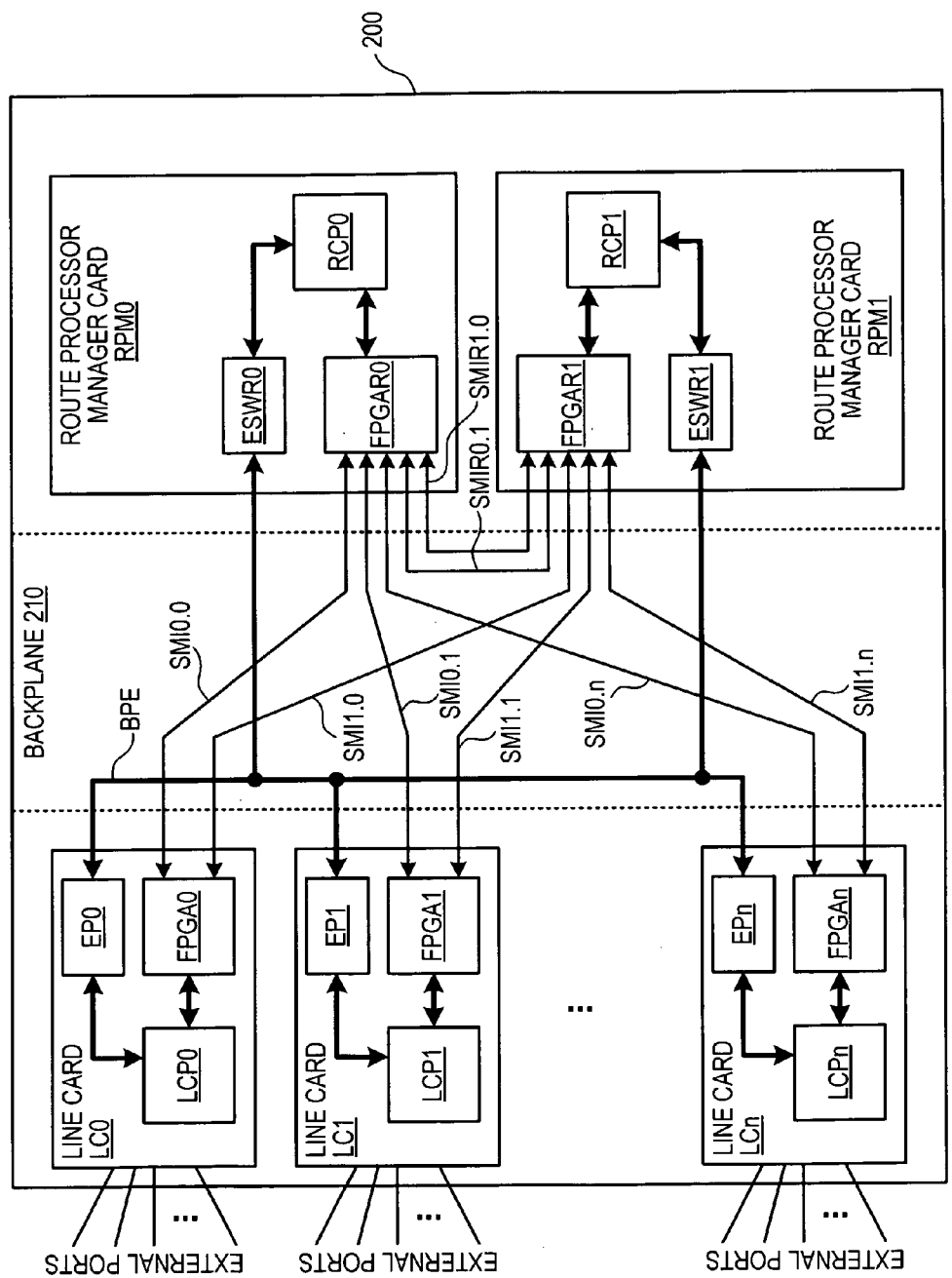
FIG. 2 contains a block diagram for a modular switch according to an embodiment.

FIG. 2 contains a block diagram for a modular packet switch 200. Similar to FIG. 1, three line cards LC0, LC1, LCn, two RPM cards RPM0, RPM1, and a backplane 210 are shown, with data plane components omitted for clarity.

Unlike FIG. 1, the FIG. 2 cards each contain an FPGA. Each line card LCi contains an FPGA FPGAi, and each RPM card RPMi contains an FPGA FPGARi. Each FPGA resides on the local bus of the control processor for the same card. The FPGAs are also linked through three-wire Serial Management Interface (SMI) buses on the backplane, with each line card FPGA FPGAi linked to each RPM FPGA FPGARj by a bus SMIj.i, with FPGARj the bus master. Likewise, the two RPM FPGAs are linked across the backplane 210 by two SMI buses, SMIR0.1 mastered by FPGAR0, and SMIR1.0 mastered by FPGAR1. Further details of an exemplary line card and RPM card are presented below.

Figure 3:
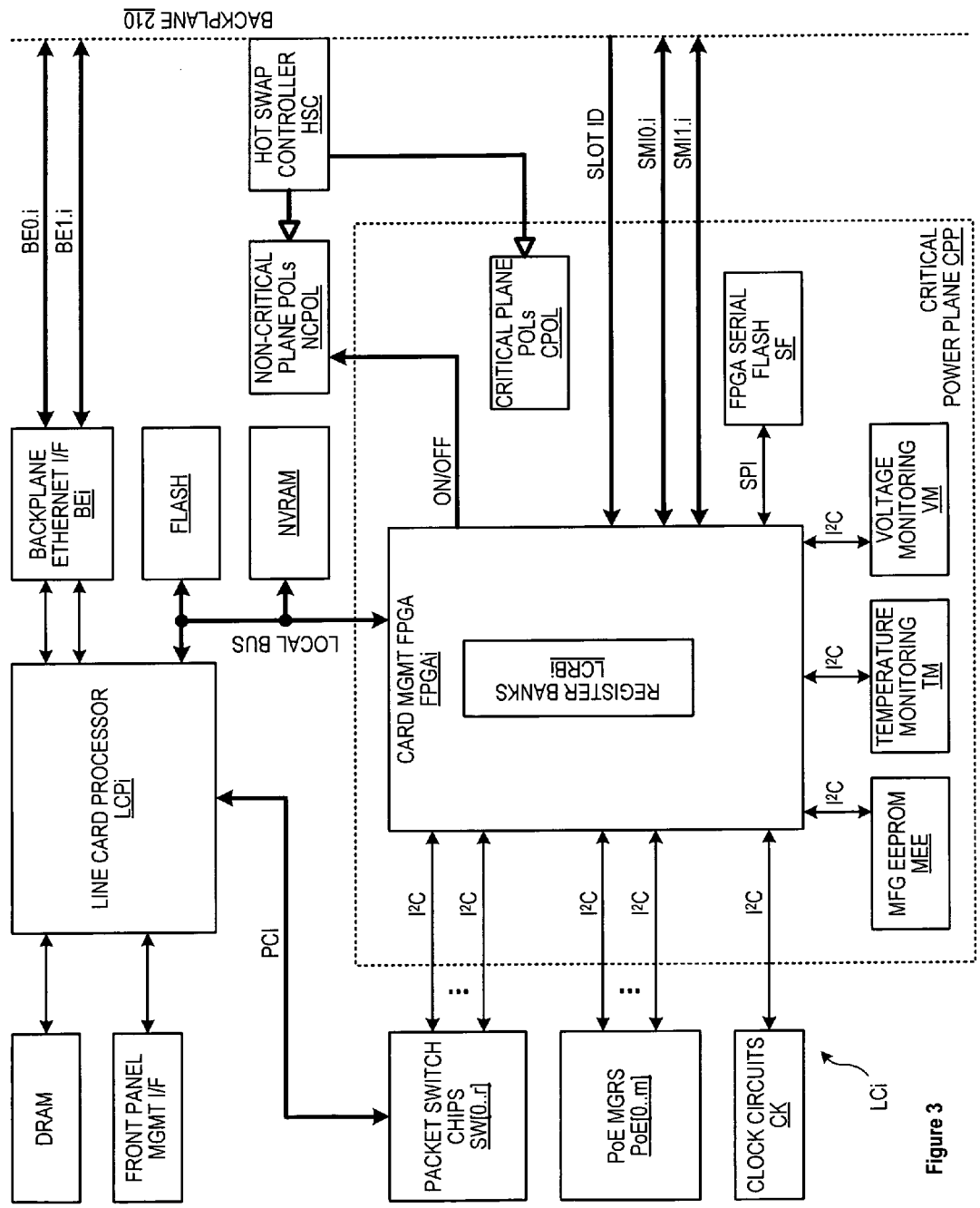
FIG. 3 contains a block diagram for a line card embodiment useful in the FIG. 2 modular switch.

FIG. 3 contains a block diagram for a line card LCi, again with data plane connections omitted for clarity. Some backplane connections are shown, including: two backplane Ethernet connections (one to each RPM card) BE0.$i$ and BE1.$i$; hot swap controller HSC connections, which are used to detect when a card is being inserted or removed from a backplane slot; slot ID connections, which present a signature representative of the slot in which a card is inserted; and two backplane SMI connections (one to each RPM card) SMI0.$i$ and SMI1.$i$. The other illustrated line card components are divided into those existing in a critical power plane CPP, which receive power whenever the card is inserted in a powered chassis, whether the line card is on or not, and those that are not powered when the card is not powered. The critical plane components include a card management FPGA FPGAi, critical plane POLs (Point of Load voltage converters) to supply power at voltages needed by the CPP ICs, an FPGA serial flash SF, voltage monitoring circuitry VM, temperature monitoring circuitry TM, and a manufacturing EEPROM (Electronically Erasable Programmable Read-Only Memory) MEE to store information identifying the card and card type. The non-critical plane components include non-critical plane POLs, the line card processor LCPi, its associated DRAM (Dynamic Random Access Memory), FLASH PROM, and NVRAM (Non-Volatile Random Access Memory), a backplane Ethernet interface BEi, a front panel management interface, one or more packet switch chips SW[0 . . . r], one or more PoE (Power over Ethernet, if so equipped) managers PoE[0 . . . m], and clock circuits CK. Other data path components, such as PHYs for external ports, will also typically exist but are omitted for clarity.

Upon insertion of the card into a powered chassis, or the application of power to the chassis, the hot swap controller HSC supplies power to the critical plane POLs, which in turn power up the card management FPGA. The FPGA accesses the serial flash SF across a SPI (Serial Peripheral Interface) bus to obtain a bitstream containing FPGA command and configuration data (this process also happens upon a master reset). Upon successful configuration, the FPGA begins its programmed tasks.

The card management FPGA, FPGAi, is configured with a plurality of $I^2C$ interfaces. Each $I^2C$ interface connects the FPGA to one or more of the line card components, such as voltage monitoring VM, temperature monitoring TM, manufacturing EEPROM MEE, packet switch chips SW[0 . . . r], PoE managers PoE[0 . . . m], or clock circuits CK. The card management FPGA acts as an $I^2C$ master on each such bus, automatically accessing the local devices to monitor their condition, and storing monitored parameters locally on the FPGA in register banks LCRBi (only the critical power plane components are accessible if the line card is powered down). Because accessing these other components does not involve a card CPU, the $I^2C$ busses can be relatively slow speed without impacting CPU performance. The FPGA also reads its slot ID and stores this value in register banks LCRBi.

The card management FPGA sends a startup indication to both RPM FPGAs, assuming both are operating the clock lines of their respective buses SMIj.i, notifying the RPMs that the card is alive. Upon receiving a command from the designated master RPM, via a write to a designated register in register banks LCRBi, the card management FPGA signals the non-critical plane POLs NCPOL to power up the non-critical plane components of line card LCi.

The linecard FPGA communicates regularly with the primary and secondary RPM FPGAs. If non-critical plane power is lost on the linecard, the FPGA sends an immediate, unsolicited shutdown indication to the RPM card(s) FPGA. The linecard FPGA can be programmed to upload other important indications to an RPM without delay, e.g., by issuing a write request to a register on the RPM FPGA. Such indications can include failures and failure causes, and temperature/voltage monitored values.

Another use of the FPGA upload capability is to maintain a card-to-card heartbeat. For instance, in one embodiment the master FPGA of two FPGAs communicating across an SMI bus downloads a heartbeat value to a designated register of the slave FPGA. The slave FPGA increments the heartbeat value and uploads the heartbeat value back to a designated register on the master FPGA. Assuming the master FPGA receives the expected value, it again increments the heartbeat value and downloads it again to the slave FPGA. Both FPGAs implement timers, and thus can declare a heartbeat failure when the correct heartbeat value is not returned by the expected time. The heartbeat interval and failure detection interval can be set quite short, without involving the card CPUs unless a heartbeat failure occurs. Alternately, the CPU can check the heartbeat value and update it, causing the master FPGA to initiate the next heartbeat exchange.

Downloaded values can include settings for the peripheral devices managed by the linecard FPGA. For instance, the FPGA can be instructed via download to instruct a PoE manager, across the appropriate $I^2C$ bus, to turn on or off power to a PoE port.

Preferably, the line card processor LCPi couples to the card management FPGA FPGAi via a high-speed local bus. This allows FPGAi to receive additional diagnostics or parameters from LCPi, and/or for FPGAi to send additional diagnostics or parameters (regarding line card ICs or possibly the RPMs) to LCPi. FPGAi can also notify LCPi should a heartbeat failure be detected with respect to one of the RPMs.

Figure 4:
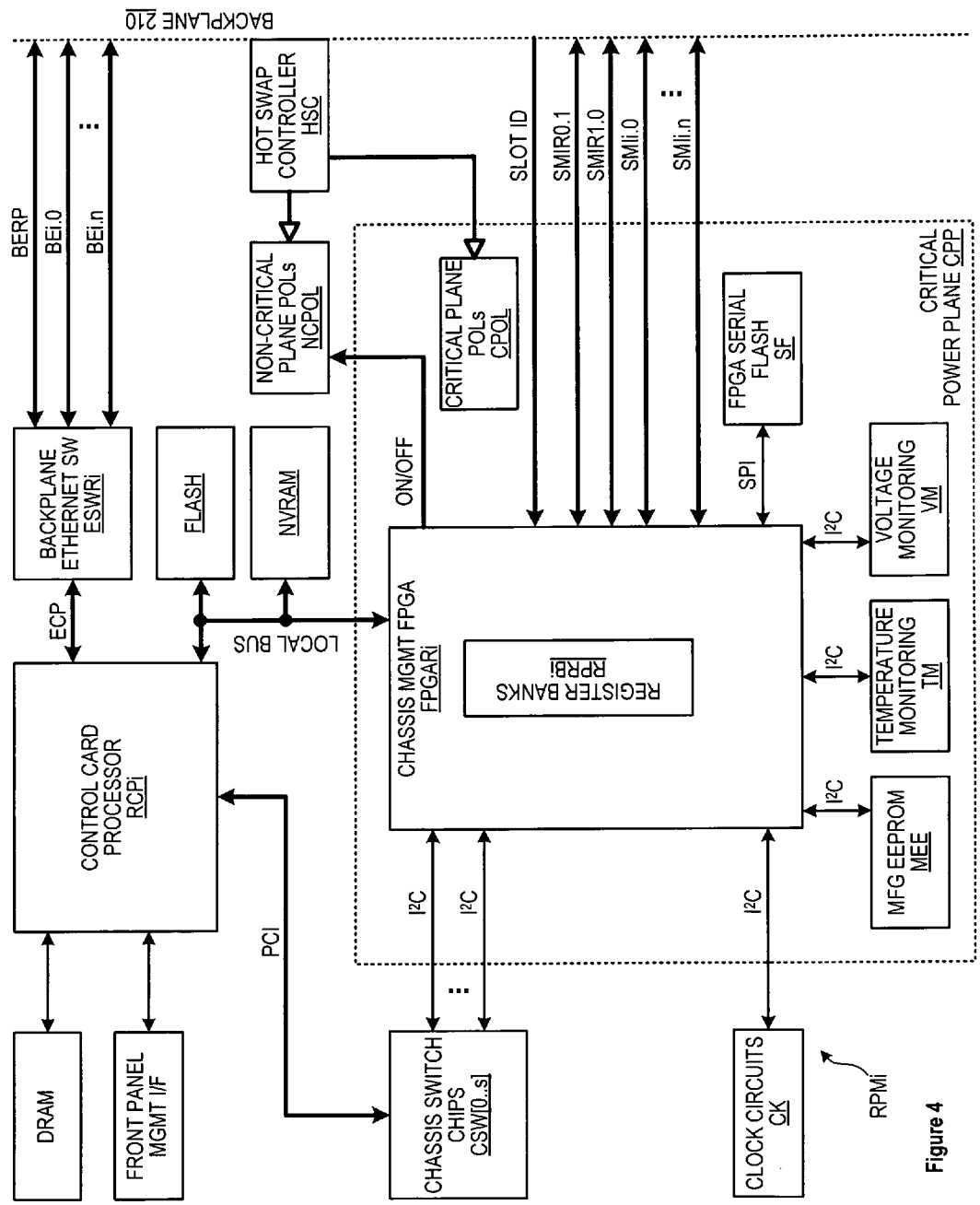
FIG. 4 contains a block diagram for a route processor card embodiment useful in the FIG. 2 modular switch.

FIG. 4 contains a block diagram for a RPM card RPMi, again with data plane connections omitted for clarity. Some backplane connections are shown, including: a backplane Ethernet connection BERP, which connects to the other RPM; backplane Ethernet connections BEi.0 to BEi.n, one for each line card; hot swap controller HSC connections, which are used to detect when a card is being inserted or removed from a backplane slot; slot ID connections, which present a signature representative of the slot in which a card is inserted; two backplane SMI connections SMIR0.1 and SMIR1.0 to the other RPM, one of which RPMi is the master and one of which RPMi is the slave; and backplane SMI connections SMIi.0 to SMIi.n, one to each line card. The other illustrated RPM card components are divided into those existing in a critical power plane CPP, which receive power whenever the card is inserted in a powered chassis, whether the RPM is on or not, and those that are not powered when the card is not powered. The critical plane components include a chassis management FPGA FPGARi, critical plane POLs (Point of Load voltage converters) to supply power at voltages needed by the CPP ICs, an FPGA serial flash SF, voltage monitoring circuitry VM, temperature monitoring circuitry TM, and a manufacturing EEPROM (Electronically Erasable Programmable Read-Only Memory) MEE to store information identifying the card and card type. The non-critical plane components include non-critical plane POLs, the control card processor RCPi, its associated DRAM (Dynamic Random Access Memory), FLASH PROM, and NVRAM (Non-Volatile Random Access Memory), a backplane Ethernet switch ESWRi, a front panel management interface, one or more chassis switch chips CSW[0 . . . s], and clock circuits CK. Other data path components and/or processors will also typically exist but are omitted for clarity.

From a control standpoint, card RPMi operates in similar fashion to line card LCi of FIG. 3. Since the RPM is expected to operate the entire chassis, however, it maintains more SMI connections and is the master on all such connections except for one connection to the other RPM, on which the other RPM is master. Chassis management FPGA FPGARi acts as an intermediary for control card processor RCPi, delivering card control instructions to the other cards as instructed, and collecting parameters from those cards. Instead of having to poll other devices on other cards (or the RPM), control card processor need only periodically read the register banks RPRBi on FPGARi to evaluate the current status of the system components. Urgent messages from another FPGA, loss of a heartbeat, etc., can prompt FPGARi to interrupt RCPi for prompt handling.

Figure 5:
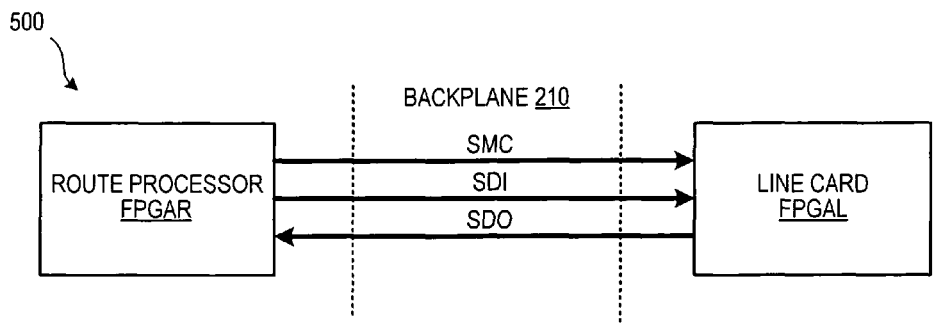
FIG. 5 shows a typical bus arrangement between a route processor module and a line card in an embodiment.

FIG. 5 contains a block diagram 500, illustrating the SMI connections between a route processor FPGA FPGAR and a line card FPGA FPGAL. Each SMI connection comprises three single-ended unidirectional signal paths SMC, SDI, and SDO (and a common digital ground path, not shown) connected through backplane 210. FPGAR is the master of the bus, and thus transmits a clock signal on SMC. The clock signal can range up to a maximum programmable clock frequency of 50 MHz. The clock signal is used by both FPGAR and FPGAL to send and receive data frames. FPGAR drives data frames to FPGAL on serial data in line SDI; FPGAL drives data frames to FPGAR on serial data out line SDO.

Figure 6:
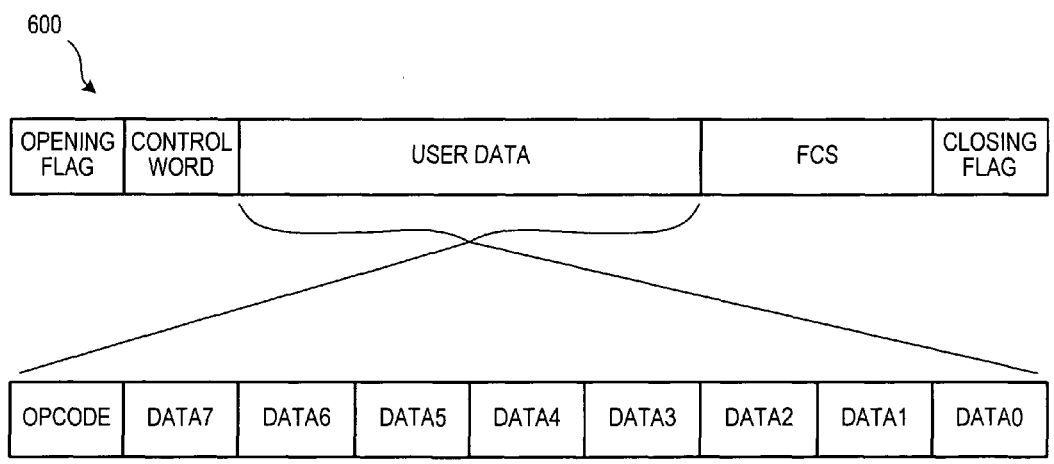
FIG. 6 depicts a packet format used in an embodiment for communication between the modules of the FIG. 2 switch.

When either FPGAR or FPGAL communicates with its peer, it sends a 14-octet frame with the frame format 600 shown in FIG. 6. Opening and closing flags having a defined bit pattern delineate the packet beginning and ending. The opening flag is followed by a control word, which can take a fixed value unless additional complexity is desired. Nine octets of user data, including an operation code (opcode) and eight octets of data, follow the control word. A two-octet frame check sequence FCS follows the user data, and allows the receiver to validate that it received the frame correctly.

The opcodes used in a given chassis can be tailored to the application. For instance, in one embodiment two opcodes are set aside to transmit startup and shutdown indications. The startup indication frame is transmitted by a FPGA that has just been powered up or reset, to alert its peer that it is ready to communicate. A shutdown indication frame alerts the peer that non-critical power has been shutdown on the card, leaving the FPGA and other critical power plane components as the only operational components of the card.

Two opcodes are assigned to a read operation on a peer FPGA register. The FPGA desiring to read remote data issues a read request frame, identifying the address of the desired register. The FPGA receiving such a request reads the desired register, and supplies the value in a read response frame to the requester.

Two opcodes are assigned to a write operation on a peer FPGA register. The FPGA desiring to write remote data issues a write request frame, identifying the address of the desired register and the value to be written. The FPGA receiving such a request writes the desired register, if a write is allowed, or disregards the request. In either case, the receiving FPGA issues a write response to the requester, indicating either success or failure for the write operation. The receiving FPGA may also trigger some other operation (for example, a heartbeat update) upon receiving a write request.

For convenience, other opcodes can be defined for diagnostic purposes. For instance, two opcodes can be used to enable and disable loop-back paths in the peer, allowing an FPGA to evaluate the integrity of the round-trip SMI pathway and possibly isolate a fault. An opcode can also be defined as a response to a frame with an invalid or unknown opcode, or a corrupted frame.

Various features of the embodiments can be combined in ways other than those shown to create alternate embodiments having greater, fewer, or different capabilities than those illustrated. Bus types and bus protocols are exemplary, and can be adapted to individual situations. Although FPGAs are described as the cooperating card monitoring devices, other hardware devices with similar functionality can be substituted in a given embodiment, and/or multiple cooperating devices can be used on a card to implement the functionality. Although the exemplary embodiments show a chassis management card and a packet line card, the embodiments described herein are applicable to other modular-chassis systems as well.

Although the specification may refer to "an", "one", "another", or "some" embodiment(s) in several locations, this does not necessarily mean that each such reference is to the same embodiment(s), or that the feature only applies to a single embodiment.

What is claimed is:

1. An electronic system comprising:
a first route module, the first route module having a first route processor and a first route field-programmable gate array (FPGA) that is capable of communicating with the first route processor and that receives power when the first route module is powered down, wherein the first route FPGA includes a heartbeat timer and a heartbeat counter;
a plurality of removable line modules each having multiple electronic components, each including a line processor and a line FPGA that is capable of communicating with the line processor and that receives power when the second module is powered down, wherein the line FPGA in each line module controls at least some of the multiple electronic components of that line module without the involvement of the line processor; and
a first point-to-point serial management bus connection dedicated between the first route FPGA and each line FPGA in each line module, wherein the first route FPGA sends control commands over each first point-to-point serial management bus connection to the line FPGAs to control the at least some of the multiple electronic components, and wherein each line FPGA is operable to push data to the first route module;
wherein the first route FPGA and each line FPGA are configured to exchange heartbeat messages with each other across their first point-to-point serial management bus connection, at least some of the heartbeat message exchanges occurring without the involvement of the first route processor and without the involvement of the line processors, and wherein the first route FPGA is capable of alerting the first route processor when heartbeat message exchanges from the line FPGAs fall outside of a set of parameters set for a normal heartbeat message exchange.

2. The electronic system of claim 1, wherein each of the line FPGAs include a heartbeat timer and a heartbeat counter, and wherein the line FPGAs are capable of alerting the first route FPGA when heartbeat message exchanges from the first route FPGA fall outside of a set of parameters set for a normal heartbeat message exchange.

3. The electronic system of claim 1, wherein each of the line FPGAs include a heartbeat timer and a heartbeat counter, and wherein the line FPGAs are capable of alerting the line processors when heartbeat message exchanges from the first route FPGA fall outside of a set of parameters set for a normal heartbeat message exchange.

4. The electronic system of claim 1, wherein each of the line FPGAs controlling at least some of the multiple electronic components of the line modules includes each of the line FPGAs controlling power supplied to at least one of the multiple electronic components in response to control commands from the first route FPGA.

5. The electronic system of claim 1, wherein each of the line FPGAs controlling at least some of the multiple electronic components of the line modules includes each of the line FPGAs acting as a bus master on a second serial management bus between the line FPGA and a first one of the at least some of the multiple electronic components of the line module.

6. The electronic system of claim 5, wherein each of the line FPGAs includes a register bank accessible by the first route FPGA, the line FPGAs loading monitored parameters from the first one of the at least some of the multiple electronic components across the second serial management bus, and placing the monitored parameters in the register bank.

7. The electronic system of claim 5, wherein the first one of the at least some of the multiple electronic components monitors an environmental parameter of its line module, and makes the environmental parameter available to the line FPGA in that line module as a monitored parameter.

8. The electronic system of claim 5, wherein the second serial management bus operates at a slower clock rate than the first serial management bus.

9. The electronic system of claim 1, wherein each of the line modules includes a critical power plane that supplies power to the line FPGA and not to the line processor, the critical power plane powered whenever the line modules receive power.

10. The electronic system of claim 9, wherein the line FPGA controls power supplied to the line processor as commanded by the first route FPGA.

11. The electronic system of claim 1, further comprising:
a second route module, the second route module having a second route processor and a second route FPGA that is capable of communicating with the second route processor and that receives power when the second route module is powered down; and
a second point-to-point serial management bus connection between the second route FPGA and each line FPGA in each line module, the second route FPGA sending control commands to each of the line FPGAs to control the at least some of the multiple electronic components on the line modules over the second point-to-point serial management bus connections.

12. The electronic system of claim 11, wherein the first and second route FPGAs are linked by a plurality of third point-to-point serial management bus connections.

13. The electronic system of claim 12, wherein the first route FPGA includes a heartbeat timer and a heartbeat counter for heartbeat message exchanges with the second route FPGA over at least one of the third point-to-point serial management bus connections.

14. A method of operating a modular packet network device comprising multiple removable line cards, the method comprising:
for each of the multiple removable line cards, managing physical operation of the line card from a central route module by communication with a line card field-programmable gate array (FPGA) on the line card over a dedicated serial management bus between the line card FPGA and the central route module;
providing power to the line card FPGA when its associated line card is powered down;
for each of the multiple removable line cards, managing packet handling of the line card from the central route module by communication with a line card processor on the line card over a packet bus;
pushing data from each line card FPGA to the central route module; and
exchanging heartbeat messages between the central route module and each line card FPGA across their dedicated serial management bus, at least some of the heartbeat message exchanges occurring without the involvement of the central route module and without the involvement of the line card processor, and wherein the line card FPGAs each include a heartbeat timer and a heartbeat counter and are capable of alerting the central route module when heartbeat message exchanges from the central route module fall outside of a set of parameters set for a normal heartbeat message exchange.

15. The method of claim 14, further comprising each of the line card FPGAs monitoring environmental conditions on their respective line cards, and transmitting an unsolicited alert to the central route module upon the occurrence of an abnormal environmental condition.

16. The method of claim 14, wherein managing physical operation of each line card from a central route module by communication with the line card FPGA comprises operating a route card FPGA on the central route module, the route card FPGA communicating with the line card FPGAs, respectively, using the respective dedicated serial management buses, wherein the route card FPGA receives power when the central route module is powered down.

17. The method of claim 16, wherein the route card FPGA and each of the line card FPGAs exchange heartbeat messages over the respective serial management buses, each line card FPGA evaluating received heartbeat messages to determine the health of the route card FPGA, and the route card FPGA evaluating received heartbeat messages to determine the health of each of the line card FPGAs.

18. The method of claim 16, further comprising the route card FPGA controlling power to a line card processor via communicating commands to the line card FPGA on the same line card as the line card processor.

* * * * *